United States Patent [19]

Klein et al.

[11] 4,052,301

[45] Oct. 4, 1977

[54] PROCESS FOR PURIFYING WASTE WATER

[75] Inventors: Rainer Klein; Jürgen Helberg, both of Kelkheim, Taunus, Germany

[73] Assignee: Hoechst Aktiengesellschaft, Frankfurt am Main, Germany

[21] Appl. No.: 596,162

[22] Filed: July 15, 1975

[30] Foreign Application Priority Data

July 17, 1974 Germany .......................... 2434293

[51] Int. Cl.² .............................................. C02B 1/20
[52] U.S. Cl. ........................................ 210/51; 210/56
[58] Field of Search ...................... 210/42, 44, 45, 47, 210/50-54, 59, 60

[56] References Cited

U.S. PATENT DOCUMENTS

| 2,204,812 | 6/1940 | Muskat | 210/52 |
| 3,523,825 | 8/1970 | Callahan et al. | 210/60 |
| 3,536,617 | 10/1970 | Collins | 210/44 |
| 3,798,160 | 3/1974 | Huffman | 210/52 |

FOREIGN PATENT DOCUMENTS

| 84,354 | 11/1969 | Germany | 210/53 |
| 302,315 | 4/1971 | U.S.S.R. | 210/52 |
| 319,555 | 1/1972 | U.S.S.R. | 210/42 |

OTHER PUBLICATIONS

Mellor, *Comprehensive Treatise on Inorganic & Theoretical Chemistry*, vol. 7, 1928, pp. 39 and 40.

Primary Examiner—Wilbur L. Bascomb, Jr.
Assistant Examiner—Peter A. Hruskoci
Attorney, Agent, or Firm—Curtis, Morris & Safford

[57] ABSTRACT

Extraction waste water produced upon the polymerization of olefins, which contains titanium and aluminum compounds and which is adjusted to a pH varying from 4.5 to 9.5. Hereby titanium and aluminum hydroxides occur in an easily precipitating state.

3 Claims, 1 Drawing Figure

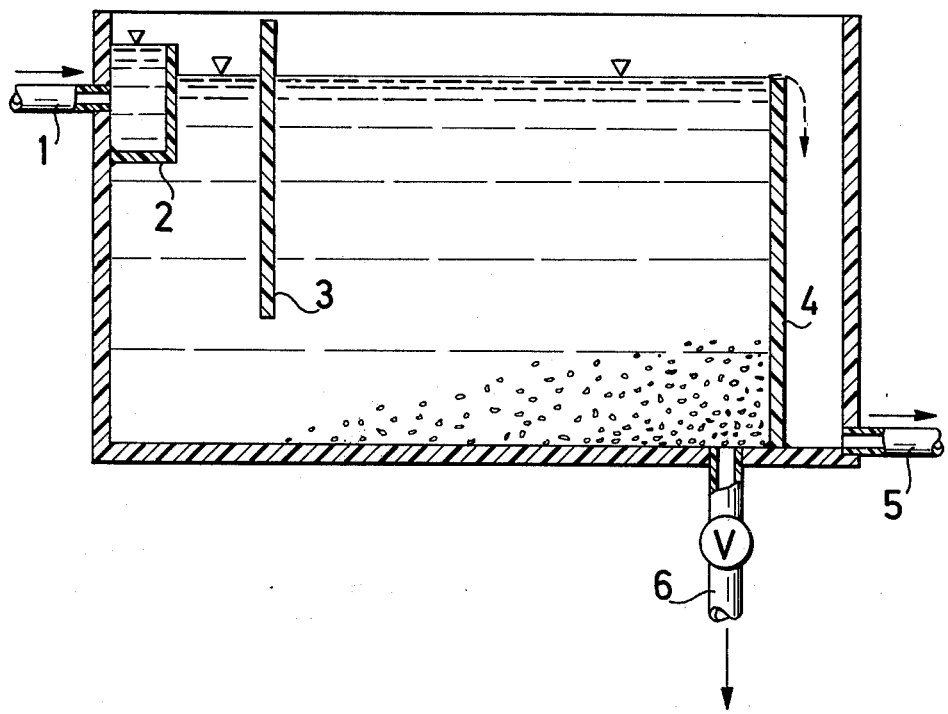

PROCESS FOR PURIFYING WASTE WATER

The process according to Ziegler allows for polymerizing ethylene and 1-olefins in an inert solvent or dispersant, e.g., a hydrocarbon, in the presence of a titanium halide and of an aluminum alkyl compound as catalyst under a low pressure and at a relatively low temperature to yield polyolefins. This process provides the polymers finely dispersed which have to be submitted to further treatment for the elimination of dispersants and catalysts. This further treatment consists in the elimination of the catalyst remnants clinging to or incorporated in the polymer preferably by mixing the polymer suspension with an alcohol first, the catalyst components being converted into water-soluble titanium and aluminum compounds, and subsequently in carrying out a thorough extraction with water, diluted acids or bases.

This dispersant-free extraction water — in the following called "waste water" — which occurs upon further treatment of polyolefins, is thus polluted by alcohols, titanium and aluminum compounds and inorganic acids or bases. From these contaminants the alcohol may be separated, e.g., by steam jet stripping and either recovered or eliminated by biological degradation, the other contaminating components remain in the waste water; the obligatory result is a high pollution degree of the main canal by a solution of catalyst metal salts.

The waste waters of a polyolefin production plant are generally first conveyed through a piping system into a waste water collecting tank, from where they are transferred to further waste water treatment installations, e.g., to the distillation plant for recovering alcohol. A serious disadvantage is the fact that as well in biological sewage purification plants and/or other types of treatment plants a pH of the waste water of less than 10 has the titanium and aluminum salts, which are dissolved in the waste water, gradually build up linings inside the pipe walls. For this reason the flow of waste water decreases more and more with time. Finally, the whole piping system — including pumps, regulating devices, waste water collecting tanks of the adjacent purification steps, e.g., distillation column for recovering alcohol, has to be cleared from these deposits by means of costly and complicated operations, namely either by mechanical means or by boiling out with alkali lyes. Since no waste water must be produced during the cleaning operation, the polymerization has to be reduced or shut down altogether — depending on the capacity of the biological purification plant, unless a supplementary purification plant be available. These operational steps mean a considerable production decrease.

It is known that aluminum and titanium salts may precipitate as hydroxides in an aqueous medium by an addition of alkali substances, the precipitations may be more or less complete, depending on the pH. Aluminum hydroxide, for example, precipitates at a pH varying from 5 to 9; a pH higher than 9 bring forth the dissolution of the hydroxide in the presence of alkali substances while forming aluminates. Titanium compounds may precipitate as hydroxides at a pH varying from 4.5 to 7.5 which do not dissolve to form a titanate solution — contrarily to aluminum —, but which occur most frequently as colloid which settles but hesitantly.

Object of the present invention is, for environmental protection's sake as well as for a continuous operating, to provide a further treatment for the waste water resulting from the Ziegler polymerization in such a way that the contamination of the main canal with titanium and aluminum salts will be kept as low as possible and that possibly an undesirable clogging of the pipes through which the waste water flows will be avoided.

This problem is solved by the present invention by adjusting the pH of the aqueous phase — after having separated the polymer suspension — to from 4.5 to 9.5, preferably from 5 to 9 and by eliminating simultaneously the titanium and aluminum hydroxides which precipitate. The precipitation tendency and the settling speed of the hydroxides can be improved, however, by addition of suitable flocculation agents.

The purification of the waste waters is carried out as per the following details:

The waste water occuring upon extraction of the polymer suspension contains from 0.5 to 3 weight % of alcohols and titanium and aluminum compounds and hydrogen halide acid, e.g., hydrochloric acid, or inorganic bases, e.g., sodium hydroxide solution, and alkali halide, e.g., NaCl. In a vessel equipped with an agitator this waste water is adjusted to a pH of from 4.5 to 9.5 by adding acid or base either prior to or after separation of the alcohols, at a temperature of from 40° to 80° C, preferably from 50° to 70° C; suitable bases for this purpose may be diluted aqueous solutions of alkali or metal earth alkali hydroxides, ammonia or salts which produce an alkali reaction upon hydrolysis, such as sodium carbonate. Suitable acids are hydrochloric acid, sulfuric acid and others or as well salts which produce an acid reaction upon hydrolysis. Hereby the dissolved titanium and aluminum compounds precipitate as hydroxides in a flocculation sediment; depending on the precipitation conditions, such as temperature and precipitation speed, it is also possible however that partially colloidal solutions are forming. In order to avoid the formation of colloidal solutions and to improve as well the settling speed or rather the sediment-forming capacity of the hydroxides, a flocculation agent is added to the waste water. Especially suitable flocculation agents are those based on polyacrylamide, such as nonionic or partially saponified polyacrylamides which are commercially available under various names. These flocculation agents are used as aqueous solutions in concentrations varying from 0.05 to 1%, preferably from 0.08 to 0.5%, calculated on the waste water. For economical reasons it is very important that the hydroxides settle at the highest possible speed, if the waste water purification is to be carried out by a continuously operated process, since the purifying capacity of a sewage plant is essentially determined by the residence time of the waste water in a thickening device. The waste water is now fed into a thickening device either by means of a pump or freely flowing, in which the hydroxides are settling and from where they are withdrawn from the lower part either discontinuously or continuously. This tank is not heated. The thickening device may be designed in various embodiments, one of these possibilities being, e.g., a basin equipped with a feeder shaft and two weirs according to the FIGURE. The waste water being adjusted to a pH varying from 4.5 to 9.5 and optionally containing flocculation agents is fed at the inlet 1 through the feeder shaft 2 into the purification basin. In order to ascertain that the hydroxides settle completely, the purification zone itself ought to be as free as possible from currents and turbulences. This requirement can be satisfied to a great extent by directing the waste water first under a weir 3 and having it flow from there into the purifying zone between the two weirs 3 and 4. In this very zone the hydroxides are settling on the bottom of the tank and the purified supernatant water flows out over the weir 4 at the outlet 5. The mud is withdrawn from time to time at the outlet 6.

Another suitable embodiment can be a cylinder-shaped tank with a conical lower part and equipped with a rabbling device. Waste water adjusted to a pH of from 4.5 to 9.5 and an aqueous solution of flocculation agents are metered into the upper part of this thickening device simultaneously and continuously. The settling hydroxides are collected in the conical part of the thickening device by means of the rabbling installation. The thickened mud is fed into a decantation apparatus by a pump, while further quantities of flocculation agent are added for improving the filtration properties. The filtration water is combined with the purified waste water, the mud is rejected and possibly used as starting material for recovering titanium and aluminum.

A special advantage of the process according to the invention consists therefore in precipitating the titanium and aluminum salts as little soluble hydroxides at a pH of from 4.5 to 9.5, optionally while adding flocculation agents, so that they may be separated from the waste water by sedimentation. In such a way a waste water is obtained which contains much less metal salts, a fact being especially important in view to the environmental protection. The precipitation may be carried out, in principle, prior to or after special waste water purifying plants, e.g., a waste water distillation for separating alcohol and/or a biologically purifying plant.

A further advantage of the process according to the invention is also that due to the elimination of titanium and aluminum salts from the waste water the formation of linings in pipings, waste water tank and distillation column for recovering alcohol, which normally occurs at a low pH in a polyolefin producing plant, is prevented or suppressed to a large extent. Therefore a cleaning operation of the waste water purifying plant otherwise necessary in regular intervals can be dispensed with; the polyolefin production and the waste water purifying operation being coupled, the hitherto required cleaning operations meant a reduction or interruption of the polymerization capacity during the cleaning, a handicap now eliminated.

The following examples and illustration specify the details of the invention.

EXAMPLES

The purification tests are carried out with waste waters provided by a continuously operating polypropylene production plant and having the following compositions:

| | |
|---|---|
| Solid matter contents (catalyst residues) | about 1 g/liter or about 3% by volume |
| pH | from 3 – 4 or from 11 – 12 |
| density of the solid matter | about 3 g/cm$^3$ |
| alcohol contents | from 1 – 2 weight % |
| titanium contents | from 200 – 300 ppm. |
| aluminum contents | from 300 – 400 ppm. |

EXAMPLE 1

Waste water is stored in a 250 l vessel equipped with agitator and steam coil and by means of steam heating maintained at a temperature of from 60° to 65° C corresponding to the operational conditions. By the addition of diluted sodium hydroxide solution or diluted hydrochloric acid a pH of from 4.5 to 9.5 is adjusted, while stirring continuously so as to neutralize concentration fluctuations and a premature precipitation of the hydroxides. A basin as per illustration 1 is used as purifying tank of transparent plastic material having a volume of 74 liters and measuring 59 × 50 × 25 cms, the purifying zone itself between the two weirs having a volume of 54 liters. The basin is not heated.

The warm waste water is not pumped through 1 into the feeder shaft 2 by means of an adjustable rotating piston pump and first fills the entire purifying basin up to the overflow at weir 4. The average residence time of the waste water in the purifying basin is adjustable, depending on the output of the rotating piston pump, a throughput of 54 liter per hour equivalent to 1 hour of residence time proved to be favorable. At the end of a test lasting for about half an hour to one hour the titanium and aluminum hydroxides settle as mud at the bottom of the purifying basin, and clear supernatant water is flowing over weir 4. The temperature of the waste water decreases to about 50° C during the test. The purifying effect is measured by test specimen picked prior to and behind the purifying basin and subject to analysis in respect to titanium and aluminum. Selected results are specified in table 1.

Under the specified conditions the titanium contents may decrease from about 225 ppm to about 20 ppm, corresponding to an elimination of the titanium at the rate of about 91%. The elimination rate of aluminum from the waste water depends from the pH; at a pH of 11.5 practically the entire aluminum remains as an aluminate solution, whilst at pH 6 and 9 the aluminum compounds precipitate, too, so that the aluminum contents at pH 6 decreases accordingly from 360 ppm to 14 ppm corresponding to an elimination of aluminum by the rate of 96%.

The mud settled at the bottom of the purifying basin is withdrawn at the outlet 6 either discontinuously or continuously.

EXAMPLE 2

Waste water which was adjusted to a pH of 9 by means of diluted sodium hydroxide solution or hydrochloric acid was fed through a pump into an unheated thickening device equipped with a rabbling installation and having a 50 liter volume. So as to speed up the settling of the titanium and aluminum hydroxides a flocculation agent based on polyacrylamide was added at a concentration rate of 0.1 weight %. This addition of a flocculation agent may enhance the settling speed to tenfold the initial value — such as table 2 shows.

Table 3 specifies that waste water containing titanium at the rate of from 200 – 300 ppm and aluminum from 300 to 400 ppm prior to purification had contents of merely 2 ppm of titanium and 20 ppm of aluminum after purification by means of a flocculation agent.

The mud which had been separated in the thickening device was then fed into a decantation device for concentration, whereby a further quantity of flocculation agent was added (about 15 g/m$^3$ of waste water) for improving the filtration properties. After centrifugation the solid matter contained from 10 to 13% of drier; the centrifugation discharge contained about 25 ppm of solid matter.

TABLE 1

Titanium and aluminum contents of non-purified and purified waste water

| inlet quantity (1/h) | average residence time (hrs.) | pH waste water | waste water non-purified ppm Ti | Al | purified ppm Ti | Al |
|---|---|---|---|---|---|---|
| comparison 55 | 1 | 11.5 | 250 | 340 | 19 | 320 |
| 53 | 1 |  | 240 | 330 | 25 | 330 |
| 54 | 1 | 9 | 200 | 380 | 27 | 75 |
| 54 | 1 |  | 200 | 360 | 27 | 71 |
| 54 | 1 | 6 | 200 | 360 | 14 | 14 |

TABLE 2

Influence of flocculation agents on the sedimentation properties

| type of flocculation agent |  | — | polyacrylamide non ionic MW 3-5.10$^6$ | acrylamide-acrylate copolymer anionic MW 8-9.10$^6$ |
|---|---|---|---|---|
| quantity | g/m$^3$ | — | 2 | 2 |
| concentration | weight-% | — | 0.1 | 0.1 |
| settling speed | m/h | 0.1 | 0.7 | 1 |
| sediment % |  | 30 | 30 | 30 |

TABLE 3 titanium and aluminum contents of non-purified and purified waste water

| waste water | Ti (ppm) | Al (ppm) |
|---|---|---|
| non-purified | 200 – 300 | 300 – 400 |
| purified | 2 | 20 |

What is claimed is:

1. A process for the simultaneous precipitation and removal of aluminum and titanium from extraction waste water obtained by water-alcohol extraction and separation of aluminum titanium halide olefin polymerization catalyst from an olefin polymerization reaction carried out in an inert hydrocarbon solvent, said extraction water containing water soluble aluminum and titanium compounds, hydrogen halide acids or inorganic alkali bases, and alkali halides, said process consisting essentially of adjusting the pH of the waste water to a pH of from 5 to 9 by adding acid or base, at a temperature of 40° to 80° C, to precipitate said water soluble aluminum and titanium compounds as the corresponding hydroxides, settling the hydroxide precipitates, and separating said precipitated hydroxides from said waste water.

2. The process of claim 1 wherein the pH is adjusted with a base selected from the group consisting of alkali metal and alkali metal earth hydroxides, ammonium hydroxide and ammonium salts which on hydrolysis produce a base.

3. The process of claim 1 wherein the pH is adjusted with an acid selected from the group consisting of hydrochloric acid, sulfuric acid and acid salts which on hydrolysis produce an acid.

* * * * *